(12) United States Patent
Frosst

(10) Patent No.: US 10,346,451 B2
(45) Date of Patent: Jul. 9, 2019

(54) IDENTIFYING CONVERSATIONS IN UNSTRUCTURED MEDIA

(71) Applicant: salesforce.com, inc., San Francisco, CA (US)

(72) Inventor: Ian Frosst, South Rawdon (CA)

(73) Assignee: SALESFORCE.COM, INC., San Francisco, CA (US)

(*) Notice: Subject to any disclaimer, the term of this patent is extended or adjusted under 35 U.S.C. 154(b) by 398 days.

(21) Appl. No.: 15/167,336

(22) Filed: May 27, 2016

(65) Prior Publication Data

US 2017/0344630 A1 Nov. 30, 2017

(51) Int. Cl.
| | | |
|---|---|---|
| G06F 16/33 | (2019.01) | |
| G06F 16/38 | (2019.01) | |
| H04L 12/58 | (2006.01) | |
| G06F 16/335 | (2019.01) | |
| G06F 16/338 | (2019.01) | |
| G06F 16/9535 | (2019.01) | |

(52) U.S. Cl.
CPC ........ G06F 16/3344 (2019.01); G06F 16/335 (2019.01); G06F 16/338 (2019.01); G06F 16/38 (2019.01); G06F 16/9535 (2019.01); H04L 51/16 (2013.01); H04L 51/32 (2013.01)

(58) Field of Classification Search
CPC ......... G06F 17/30684; G06F 17/30696; G06F 17/30699; G06F 17/30722; G06F 17/30867; G06F 16/3344; G06F 16/38; G06F 16/338; G06F 16/9535; G06F 16/335; H04L 51/16; H04L 51/32
USPC ........................................................ 707/722
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |

(Continued)

OTHER PUBLICATIONS

"Google Plus Users", Google+Ripples; Oct. 31, 2011; 3 pages.

*Primary Examiner* — Evan Aspinwall
(74) *Attorney, Agent, or Firm* — Schwabe Williamson & Wyatt

(57) ABSTRACT

A conversation tool may display messages posted on a social media website. The conversation tool may receive selections of posts from the user interface to send associated reply messages and assign metadata for the selected posts to the associated reply messages. The conversation tool then may receive a request to display a conversation for a particular user. The conversation tool identifies the reply messages with assigned metadata associated with the user and identifies the posts associated with the identified reply messages. The conversation tool displays the identified posts with the identified reply messages as the message conversation. The conversation tool uses the reply messages as a trigger for identifying and tracking conversations between an agent and different users. The conversations allow the agent to more efficiently respond to and manage non-structured messages posted on social media websites.

20 Claims, 9 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,143,468 B1 * | 9/2015 | Cohen ............... H04L 51/16 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0035681 A1* | 2/2011 | Mandel ................ G06O 10/107 715/752 |
| 2011/0161444 A1* | 6/2011 | Chauhan ............. G06F 17/3089 709/206 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218885 A1* | 8/2013 | Satyanarayanan ... G06Q 30/016 707/728 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0237057 A1* | 8/2014 | Khodorenko ........... H04L 51/32 709/206 |
| 2014/0359537 A1 | 12/2014 | Jackobson et al. |

* cited by examiner

IDENTIFYING CONVERSATIONS IN UNSTRUCTURED MEDIA

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to identifying conversations in social media.

BACKGROUND

Companies and individuals may post content on social media websites. For example, a company may post a page including video, images, links, text, etc. announcing a new product or service. Thousands of users may comment on the post. The company may have agents reply to certain questions or complaints posted by the users.

It can be difficult for the agents to track interactions with the different users. For example, the users are free to post comments anywhere on the company social media account without attention to hierarchical organization. In another example, the social media website may display all user posts on one level underneath the company page.

The agent not only may need to discover which user comments warrant replies, but also may need to manage the user interactions. For example, the agent may need to monitor the posted user comments to determine if a reply resolved a user issue. However, due to the unstructured nature of the social media, the agent may have to review all posted comments to manually retrace a conversation stream with a particular user or user issue. With potentially thousands of user posts, tracking conversations on social media websites may be difficult and time consuming.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
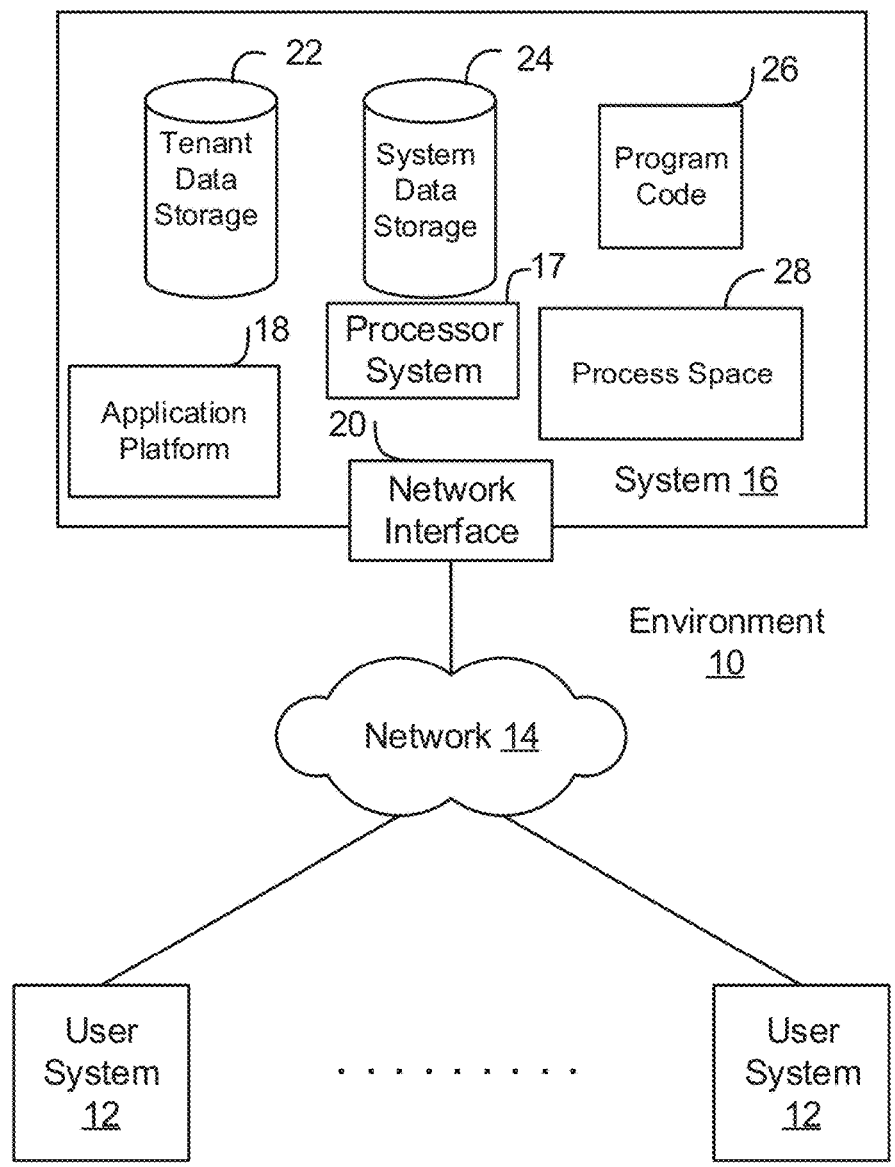
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C" "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter®) nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari. Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium®, processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
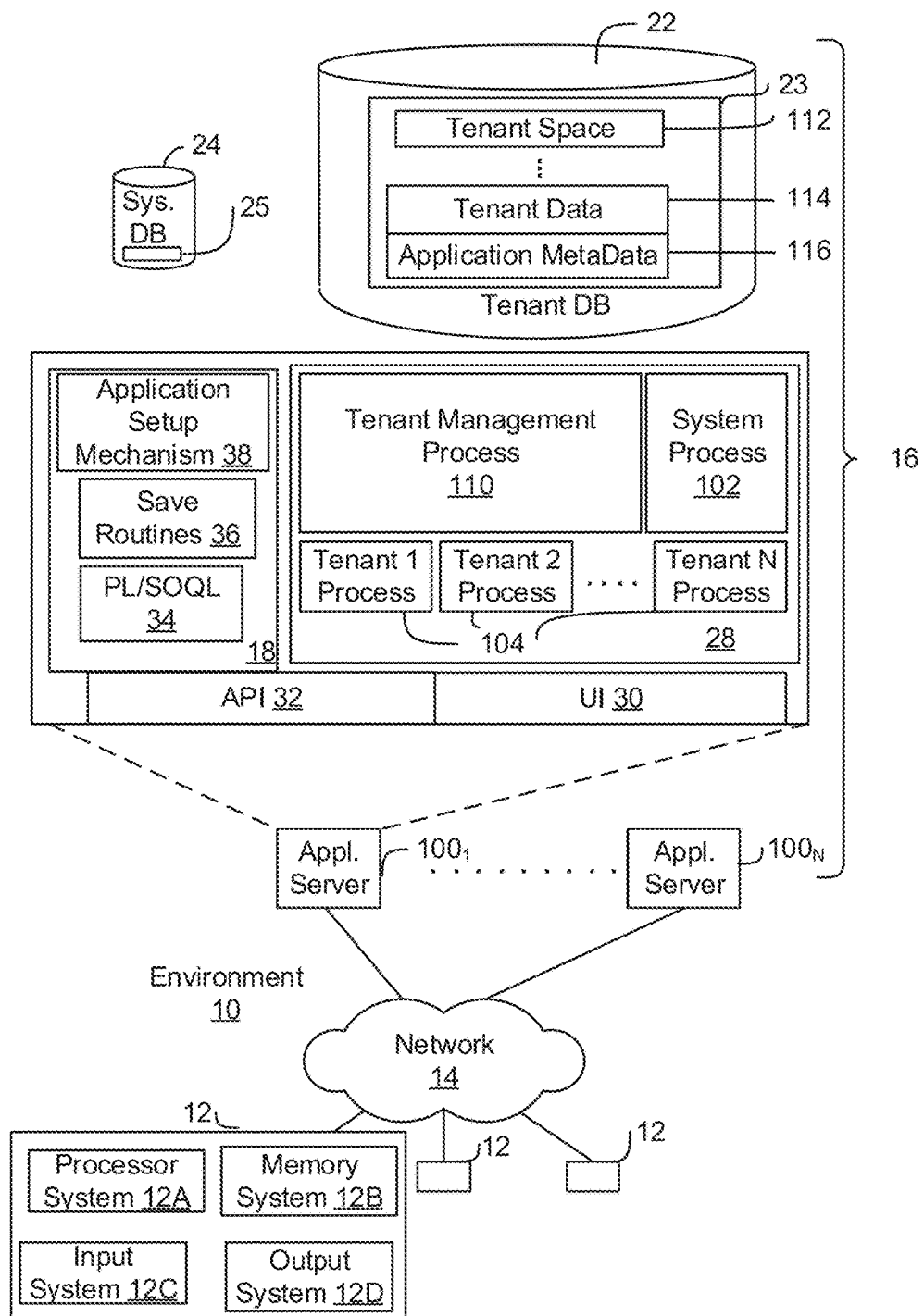
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Identifying Conversations in Unstructured Media

A conversation tool displays messages from a social media website. The conversation tool may receive selections of posts from a user interface to send associated reply messages and assign metadata for the selected posts to the associated reply messages.

The conversation tool then may receive a request to display a conversation for a particular user. The conversation tool identifies the reply messages with assigned metadata associated with the user and identifies the posts associated with the identified reply messages. The conversation tool then displays the identified posts with the identified reply messages as the message conversation.

The conversation tool uses the reply messages as a trigger for identifying and tracking conversations between an agent and different users. The conversations allow the agent to more efficiently respond to and manage non-structured messages posted on social media websites.

Figure 2:
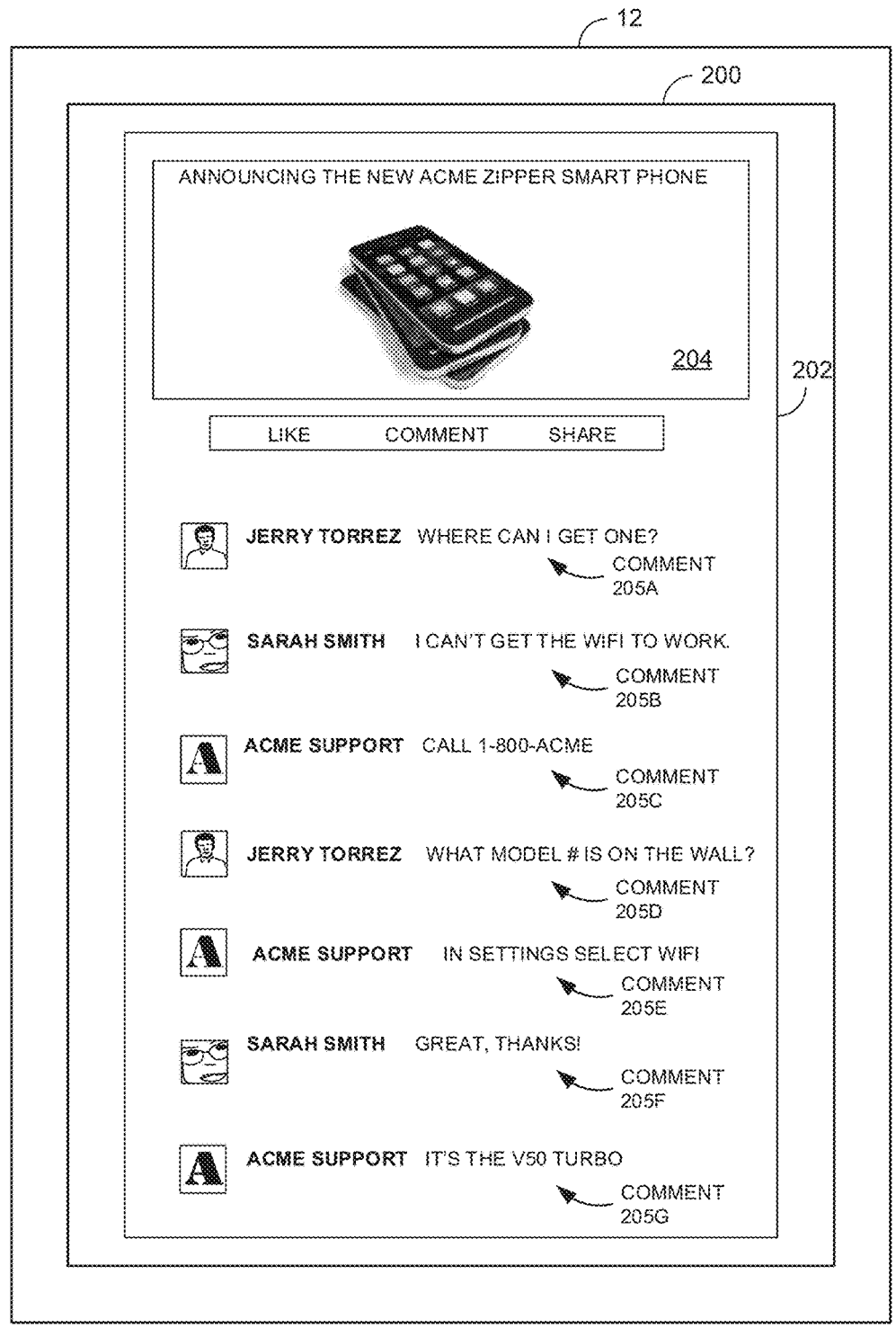
FIG. 2 shows unstructured messages posted on a social media website.

FIG. 2 shows user system 12 as described above displaying social media 202 from a social media website. User system 12 may operate a user interface 200, such as a web browser, for displaying social media 202. Social media 202 may include any data, message, video, audio, text, comment, reply, link, or the like, or any combination thereof, posted and displayed on a website.

In one example, social media 202 may include a page 204 posted by a company on a social media account. In this example, the company may sell electronic equipment and may announce in page 204 the availability of a new smart phone. This of course is just one example, and any company, user, or other entity may post any information on any social media website.

Multiple users may post comments on the website. For example, a first user Jerry Torrez may post a comment 205A asking where to get the new smart phone. A second user Sarah Smith may post a comment 205B asking how to operate the new smart phone.

The company associated with the new smart phone may employ one or more agents to respond to user comments 205A and 205B. For example, an agent may post a reply comment 205C responding to the query by user Jerry Torrez with a toll free phone number for purchasing the new smart phone. User Jerry Torrez may post another comment 205D requesting the model number for the new smart phone.

The agent may post a comment 205E responding to the query by user Sarah Smith in comment 205B. User Sarah Smith may post a comment 205F thanking the company agent for the answer in comment 205E. The company agent may post another reply comment 205G responding to the question in comment 205D posted by user Jerry Torrez.

The social media website displays all comments 205 on a same non-structured single level below posted page 204. It may be difficult for the agent to determine which comments are part of the same conversations. For example, the social media website does not indicate which user comments are associated with agent reply comments 205C, 205E, and 205G. Thus, the company agent may have to manually read each comment 205 to rediscover a conversation stream with a particular user.

Figure 3:
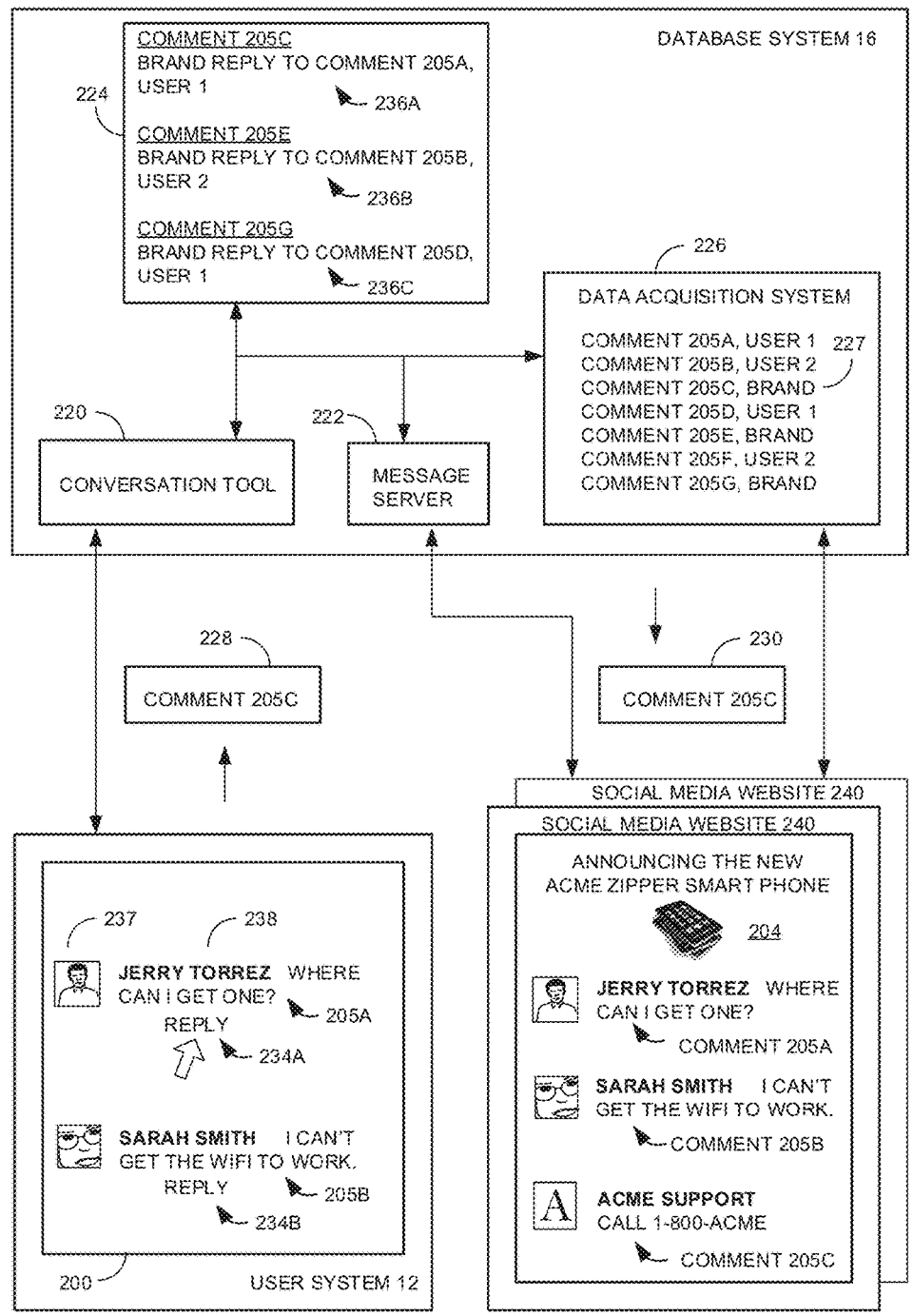
FIG. 3 shows a conversation tool operating in a database system.

FIG. 3 depicts an example conversation tool 220 that tracks user conversations in non-structured social media. Conversation tool 220 may operate within database system 16 described above and may include any combination of software and/or hardware. Conversation tool 220 also may operate in conjunction with other software tools, such as customer relationship management (CRM) software applications that manage client communications or any other cloud computing application.

A data acquisition system 226 may download messages from social media websites 240 into database system 16. For example, data acquisition system 226 may use an application program interface (API) to copy all of the messages and other metadata from a company account on social media website 240, including comments 205 posted on page 204. Data acquisition system 226 may create replications 227 of social media for any social media account on any number of social media websites 240.

An agent for the company posting page 204 may access conversation tool 220 via user system 12. Conversation tool 220 may display comments 205 from replicated website content 227 on user interface 200. Conversation tool 220 also may display reply icons 234 adjacent to comments 205.

The agent may select any one of reply icons 234 to initiate or continue a conversation with a particular user. For example, the agent may determine comment 205A from user Jerry Torrez warrants reply comment 205C. The agent may select reply icon 234A to associate reply comment 205C with user comment 205A.

In response to selecting reply icon 234A, conversation tool 220 may display a message window (not shown) for the agent to enter text, video, audio, links, documents, or any other type of data into reply comment 205C. The agent may select another icon displayed on user interface 200 to send a message 228 to conversation tool 220 that includes reply comment 205C.

Conversation tool 220 may send reply comment 205C to a message server 222 for forwarding to social media website 240. Either conversation tool 220 or message server 222 may attach or otherwise associate metadata 236A with reply comment 205C. For example, conversation tool 220 may send a request to message server 222 that includes a header with an internal identifier for user comment 205A. Message server 222 may search replicated content 227 in data acquisition system 226 to determine if the header is present.

If present, message server 222 may extract associated metadata 236A from comment 205A posted by user 1 (Jerry Torrez). Metadata 236A may include any combination of an author identifier, message identifier, social media website identifier, account identifier, timestamp, etc. Message server 222 then may assign extracted metadata 236A to reply comment 205C and store reply comment 205C and metadata 236A in database store 224. Message server 222 then may send a message 230 directing social media website 240 to post reply comment 205C.

Conversation tool 220 may assign metadata 236 to other reply comments sent by the agent via user interface 200. For example, conversation tool 220 and message server 222 may assign metadata 236B to agent reply comment 205E and assign metadata 236C to agent reply comment 205G. Metadata 236B may identify comment 205E as a reply to comment 205B posted by user 2 (Sarah Smith). Metadata 236C may identify comment 205G as a reply to another comment 205D posted by user 1 (Jerry Torrez).

Conversation tool 220 may use metadata 236 to identify and display different message conversations 250 between the agent and different users. For example, the agent may click on picture 237 or name 238 associated with comment 205A. In response, conversation tool 220 identifies all user comments 205 and associated reply comments associated with the selected user as a conversation.

For example, conversation tool 220 may search data store 224 for any reply comments 205C, 205E, and 205G with metadata 236 associated with user 1 (Jerry Torrez). Conversation tool 220 combines the identified reply comments 205A and 205G with the associated user comments 205A and 205D, respectively, as a conversation.

Figure 4:
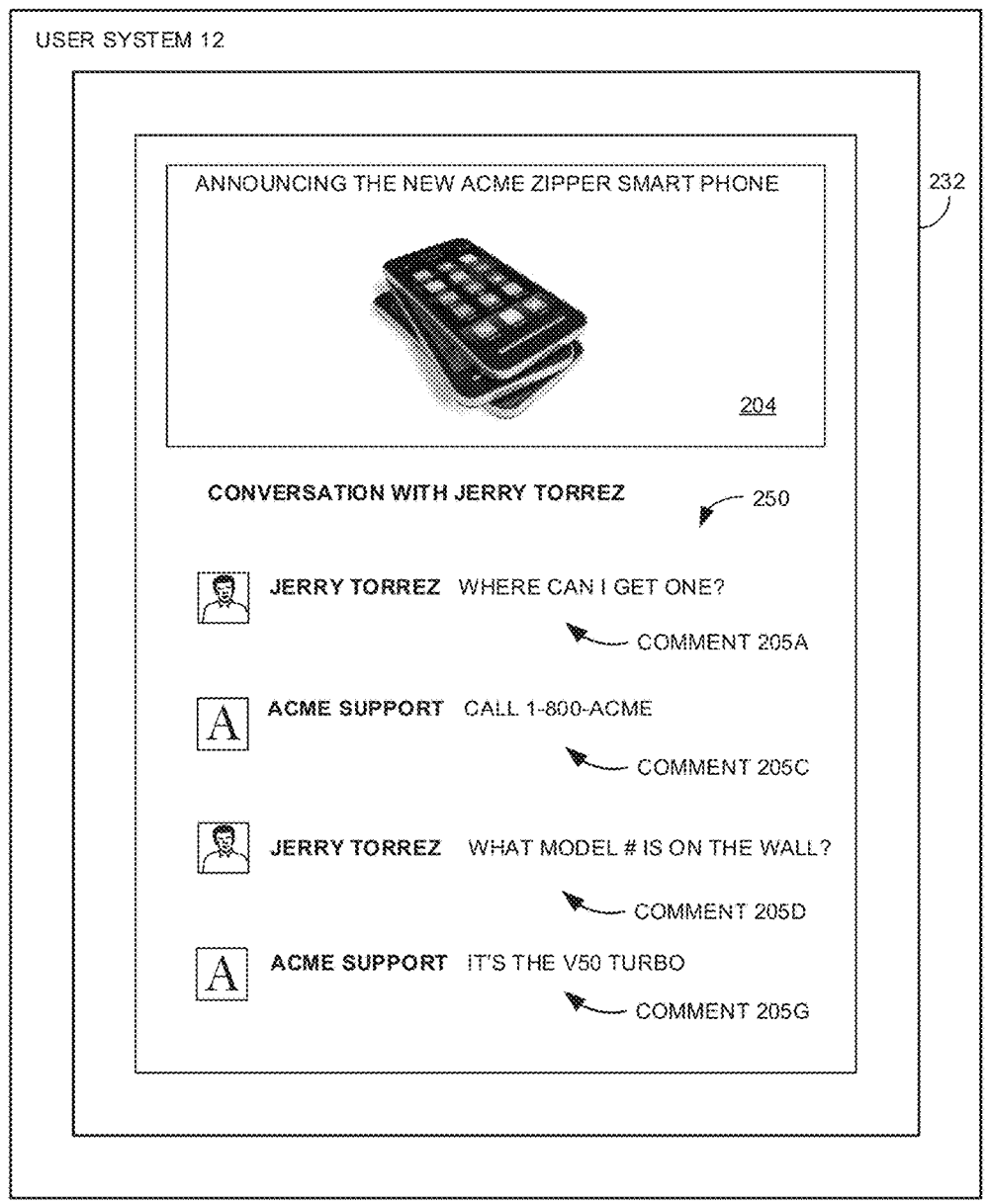
FIG. 4 shows a conversation displayed by the conversation tool.

FIG. 4 depicts an example conversation displayed by conversation tool 220. Referring to FIGS. 3 and 4, conversation tool 220 may display identified user 1 comments 205A and 205D and associated reply comments 205C and 205G, respectively, in chronological order as message conversation 250. For example, conversation tool 220 may display the first identified user comment 205A that includes an associated reply comment 205C. Conversation tool 220 then displays the next posted user comment 205D that includes an associated reply comment 205G.

Conversation tool 220 identifies conversation 250 based on the replies sent by the agent to particular selected user comments. This reply based conversation detection scheme allows conversation tool 220 to identify conversation 250 in unstructured social media with no conversation identification and in social media where conversation messages reside in a single or multiple different comment levels.

Figure 5:
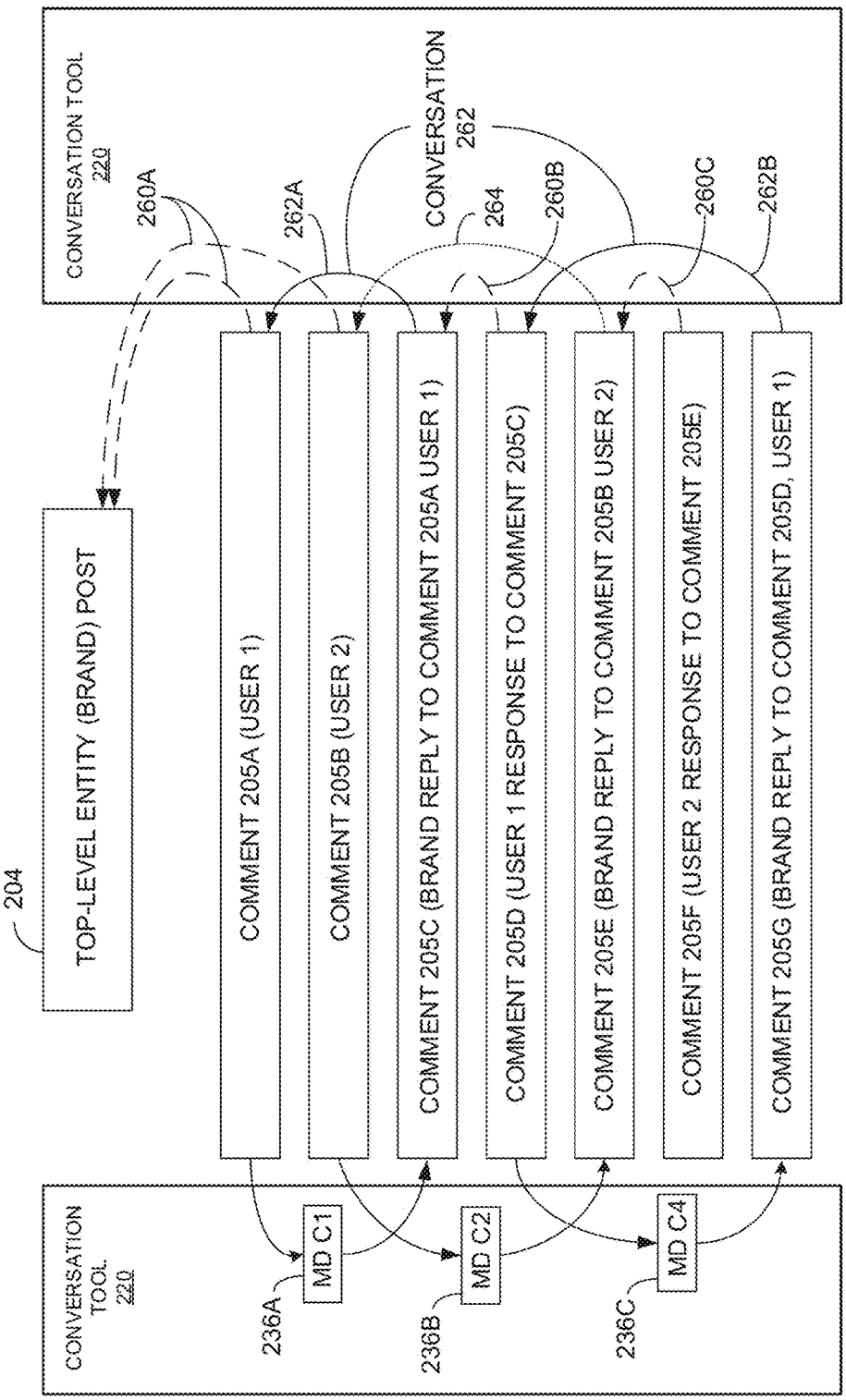
FIG. 5 shows in more detail how the conversation tool identifies conversations from unstructured comments posted on the social media website.

FIG. 5 shows operations performed by conversation tool 220 in more detail. An entity, such as a company, brand, or user may post content 204 on the social media website. Different users and brand agents may post comments 205 underneath posted content 204 on the social media account for the entity. The social media website may not provide any conversation indicators. In other words, users may post comments 205 to any other user or entity on a same or different levels underneath post 204.

User 1 may post comment 205A and user 2 may post comment 205B. At this point neither comment 205A nor 205B are associated with any other comment or conversation. This is represented by dashed lines 260A that identify comments 205A and 205B as implied responses to brand content 204.

The brand agent may select a reply icon displayed next to user 1 comment 205A and send a reply comment 205C. As described above, the reply icon is displayed by conversation tool 220. In response to sending reply comment 205C, conversation tool 220 assigns metadata 236A from comment 205A to brand comment 205C. As also mentioned above, metadata 236A may include a message identifier, user identifier, timestamp, and any other data associated with user 1 comment 205A. Solid line 262A represents an explicit functional link conversation tool 220 creates between comment 205A and 205C with metadata 236A.

User 1 may post another comment 205D on the social media website replying to agent comment 205C. Dashed line 260B represents the implied non-functional link between comment 205C and 205D. For example, the social media website provides no explicit indication comment 205D is a reply to brand comment 205C.

The brand agent may select a reply icon next to posted comment 205B and create a reply comment 205E for user 2 comment 205B. The reply icon is again displayed by conversation tool 220. In response to selecting the reply icon, conversation tool 220 assigns metadata 236B from comment 205B to brand reply comment 205E. Metadata 236B creates an explicit functional conversation link 264 between reply comment 205E and user 2 comment 205B.

User 2 may post another comment 205F on the social media website replying to agent comment 205E. Again, the social media website does not provide any structure for user 2 to indicate comment 205F is a reply to brand comment 205E. Dashed line 260C indicates the implied logical link with no physical link between comments 205F and 205E.

The brand agent may send a reply comment 205G to user 1 comment 205D. For example, the brand agent selects the reply icon displayed next to comment 205D and sends reply comment 205G. The conversation tool physically links together comments 205D and 205G as part of conversation 262B by assigning metadata 236C from comment 205D to reply comment 205G.

Conversation tool 220 may receive a request to display a conversation with a particular user. For example, the brand agent may select user 1 or user 2 from the user interface. Conversation tool 220 identifies all of the brand reply comments 205C and 205G that include metadata 236A and 236C, respectively, for the identified user. Conversation tool 220 then identifies the user comments 205A and 205D identified in the metadata 236. Conversation tool 220 combines the identified user comments and identified reply comments into a conversation 262.

There may be no explicit indication that comments 205A and 205C are part of the same conversation 262 as comments 205D and 205G. Conversation tool 220 may imply these two sets of comments are part of the same conversation 262 based on relatively closeness of timestamps for comment 205C and 205D or simply based on the agent sending replies to the same user 1.

Figure 6:
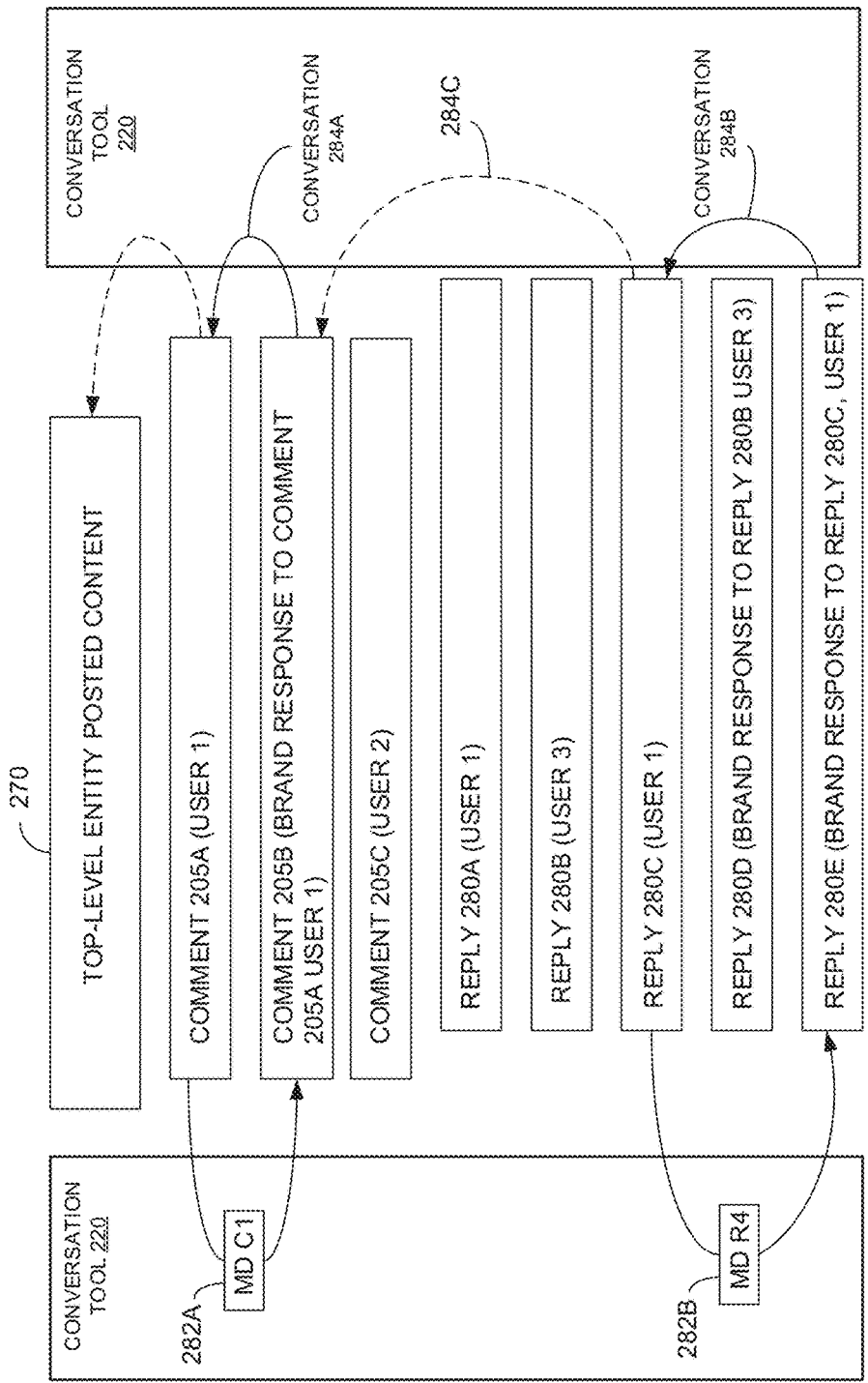
FIG. 6 shows how the conversation tool identifies conversations from multi-level comments posted on the social media website.

FIG. 6 shows an example of how conversation tool 220 may operate within multiple comment levels. In this example, an entity, such as a company or individual, may post content 270 on a social media website. User 1 may post comment 205A and user 2 may post comment 205B underneath posted content 270. In this example, the website may provide one reply level below comments 205. For example, users may post replies 280 underneath comment 205B.

In this example, the entity or brand agent may identify several posts from user 1 that warrant replies. For example, user 1 may post comment 205A and post reply 280D that include questions, complaints, etc. related to posted content 270 or content in user 2 comment 205C.

In this example, the agent may create a conversation 284 with user 1 that extends over multiple comment levels. For example, user 1 may ask a question in comment 205A regarding posted content 270. The agent uses conversation tool 220 to generate a reply comment 205B to user comment 205A. Conversation tool 220 assigns metadata 282A from user comment 205A to reply comment 205C.

User 1 later posts a reply 280C to comment 205C posted by user 2. Reply 280C also may contain content that warrants a reply by the agent. The agent selects a reply icon located next to user reply 280C and sends an agent reply 280E. Conversation tool 220 assigns metadata 282B from user reply 280C to agent reply 280E.

As described above, solid lines 284A and 284B represent the explicit physical links in conversation 284 created by conversation tool 220 between agent responses 205B and 280E and user 1 responses 205A and 280C, respectively. Dashed line 284C represents the logical link in conversation 284 implied by conversation tool 220 between comments 205A/205B and replies 280C and 280E.

By selecting user 1 from the user interface, conversation tool 220 then may display comment 205A, comment 205B, reply 280C, and reply 280E. Thus, conversation tool 220 may identify conversations 284 extending over multiple message communication levels in the social media website.

Figure 7:
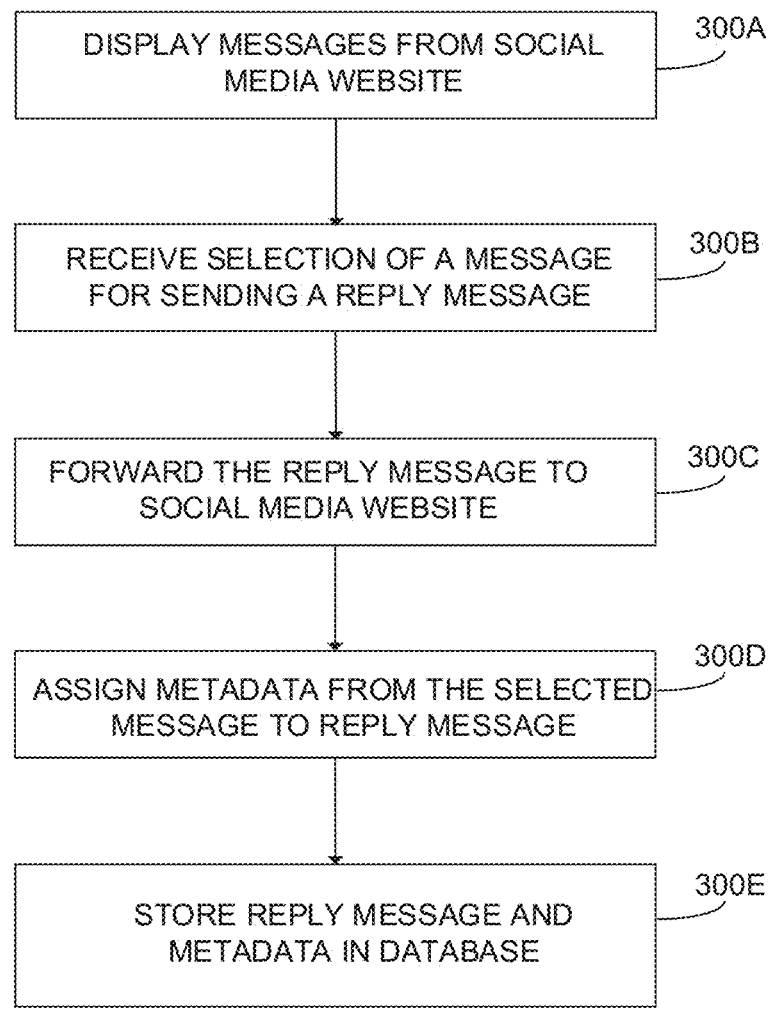
FIGS. 7 and 8 show example processes for using reply messages to identify message conversations.
Figure 8:
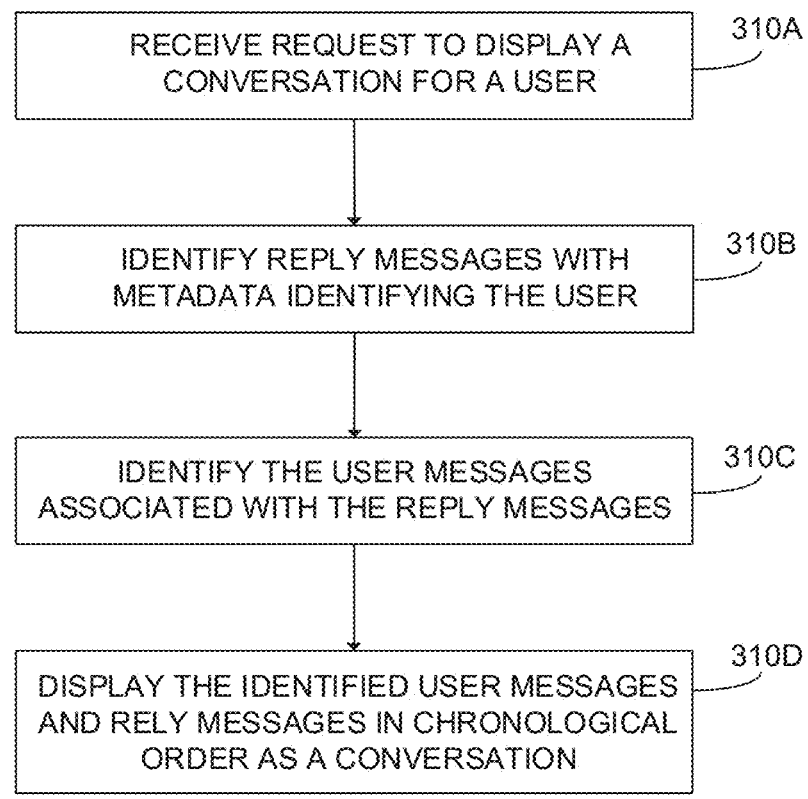

FIG. 7 shows an example process for identifying a message conversation. In operation 300A, the conversation tool displays posted messages from the social media website. As described above, a database system may have previously downloaded the messages from the social media website and then may display the downloaded social media message on a user interface.

In operation 300B, the conversation tool may receive a selection of one of the posted messages for sending a reply. For example, an agent for the entity operating the social media account may select a user message for sending a reply. The agent then may send a reply message to the conversation tool.

In operation 300C, the conversation tool may forward the agent reply message to the social media website for posting along with all of the other messages.

In operation 300D, the conversation tool may assign metadata from the selected user message to the agent reply message. As described above, the conversation tool may add a user identifier, message identifier, website identifier, account identifier, timestamp, or the like, for the selected user message to the agent reply message.

In operation 300E, the conversation tool may store the reply message and the assigned metadata in the database system. The conversation tool may similarly store other reply messages and metadata for any other messages replied to by the agent.

FIG. 9 shows an example process for displaying a message conversation. In operation 310A, the conversation tool may receive a request to display a conversation for a particular user. For example, the agent may select a name or picture for one of the posted user messages.

In operation 310B, the conversation tool may identify all of the reply messages with metadata identifying the selected user. For example, the conversation tool may identify all of the agent reply messages that include the same user identifier.

In operation 310C, the conversation tool identifies the user messages associated with the identified reply messages. For example, the conversation tool may use the metadata for the identified reply messages to locate the associated user messages.

In operation 310D, the conversation tool may display the identified user messages and reply messages as a conversation. For example, the conversation tool may first display the user messages replied to by the agent and the reply messages from the agent in chronological order based on associated timestamps.

Time gaps may exist in the conversations between the agent and the user. The conversation tool may space apart groups of conversation messages based on the time gaps. For example, the user and agent may post a first group of messages during a same day. The user and agent may post a second group of messages two weeks later. The conversation tool may space apart or provide a time indicator identifying the two-week time gap between the first group of messages and the second group of messages.

Different agents may send reply messages to the same users. For example, a call center service agent may use a customer service application to reply to customer problems and a community manager in a marketing department may engage with brand influencers. The conversation tool may store the message conversations from both agents in the same database system.

The conversation tool then may display the different conversations between the user and both agents on the same screen. The conversation tool may display the two conversations separately in a same view or in two different views. In another example, the conversation tool may interleave the two conversations together in the same view. By displaying both conversations the two agents can each track all brand conversations with the same user.

Similarly, an entity may post content on multiple different social media websites, such as Facebook®, Twitter®, Google®, etc. The database system may store replications of the social media for each of the different websites. The conversation tool then may generate and store the reply messages and associated user metadata for each website in the database system. The conversation tool then may identify and display any combination of conversations for any of the selected social media websites.

By basing conversations on reply messages, the conversation tool can identify conversations in non-structured social media posts without any defined conversation identifiers and without using a dedicated one-on-one software interaction application.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A non-transitory computer-readable medium storing instructions that, when executed by a database system, cause the database system to perform operations comprising:
   retrieving, from a social media network by a database system using an application program interface (API), a message posted on a social media website and metadata associated with the message;
   causing a user interface of a user system to display the message;
   receiving a selection of the message from the user system to initiate a reply to the message;
   assigning metadata for the selected message to the reply;
   transmitting a message to the social media website directing the social media website to post the reply;
   receiving a request to display a message conversation with a user;
   identifying the reply with assigned metadata associated with the user;
   identifying the message associated with the identified reply; and
   causing the user interface of the user system to display the identified message with the identified reply as the message conversation.

2. The computer program of claim 1, wherein the message posted on the social media website does not include a conversation identifier.

3. The computer-readable medium of claim 1, further comprising instructions operable to store messages from the social media website and associated reply messages in a database system.

4. The computer-readable medium of claim 1, wherein the metadata includes one or more of: a message identifier and an author identifier.

5. The computer-readable medium of claim 1, further comprising instructions operable to cause the user interface of the user system to display the identified message and identified reply for the message conversation in a chronological order.

6. The computer-readable medium of claim 5, further comprising instructions operable to cause the user interface of the user system to display gaps or time identifiers in the message conversation indicating time periods between different groups of identified messages and identified replies for a plurality of message conversations.

7. The computer-readable medium of claim 1, further comprising instructions operable to:
   store messages and associated replies from a plurality of social media websites in the database system;
   identify a plurality of message conversations based on the stored messages and associated replies; and
   cause the user interface of the user system to display the identified message conversations for each respective social media website from the plurality of social media websites.

8. The computer-readable medium of claim 7, further comprising instructions operable to:
   identify a first one of the replies with assigned metadata identifying the user and a first one of the messages;
   identify a second one of the replies with assigned metadata identifying the user and a second one of the messages; and display the first one of the messages, the first one of the replies, the second one of the messages, and the second one of the replies as the message conversation.

9. The computer-readable medium of claim 1, wherein the metadata includes one or more of: an author identifier, a message identifier, a social media website identifier, an account identifier, and a timestamp.

10. A method comprising:
retrieving, from a social media network by a database system using an application program interface (API), a message posted on a social media website and metadata associated with the message;
storing the message and metadata in the database system;
causing, by the database system, a user interface of a user system to display the message;
receiving, from the user system by the database system, a selection of the message to initiate a reply to the message;
receiving content for the reply to the selected message from the user system;
assigning metadata from the selected message to the reply;
storing the reply and the assigned metadata in the database system;
transmitting a message to the social media website directing the social media website to post the reply;
receiving, by the database system, a request from the user system to display a message conversation with an author for one or more of the messages posted on the social media website;
identifying, by the database system, the reply with assigned metadata associated with the author;
identifying, by the database system, one or more messages associated with the identified replies; and
causing, by the database system, the user interface of the user system to display the one or more identified messages and identified reply as the message conversation.

11. The method of claim 10, further comprising causing the user interface of the user system to display a plurality of identified messages and identified replies for the message conversation in a chronological order.

12. The method of claim 10, further comprising:
causing the user interface of the user system to display messages from a plurality of different social media websites;
receiving selections, from the user system, of the messages from the plurality of social media websites for which to initiate replies; and
assigning metadata to the respective replies for each respective selected message, wherein the metadata identifies one or more of: the social media websites, the selected messages, and authors of the selected messages.

13. The method of claim 10, wherein the message posted on the social media website does not include a conversation identifier.

14. The method of claim 12, further comprising:
identifying a first one of the replies with assigned metadata identifying the author and a first one of the messages;
identifying a second one of the replies with assigned metadata identifying the author and a second one of the messages; and
displaying, on the user interface of the user system, the first one of the messages, the first one of the replies, the second one of the messages, and the second one of the replies as the message conversation.

15. The method of claim 10, wherein the metadata includes one or more of: an author identifier, a message identifier, a social media website identifier, an account identifier, and a timestamp.

16. A database system, comprising:
a processor; and
memory coupled to the processor and storing instructions that, when executed by the processor, cause the database system to perform operations comprising:
retrieving, from a social media network by a database system using an application program interface (API), a message posted on a social media website and metadata associated with the message;
causing a user interface of a user system to display the message;
receiving a selection of the message from the user system to initiate a reply to the message;
receiving content for the reply to the selected message from the user system;
transmitting a message to the social media website directing the social media website to post the reply;
assigning metadata from the selected message to the reply, wherein the metadata includes an author identifier and a message identifier; and
storing the reply and the assigned metadata in the database system.

17. The database system of claim 16, wherein the instructions are further operable to:
receive a request from the user system to display a message conversation associated with an author;
identify the reply stored in the database, the reply having an assigned author identifier associated with the author;
identify one or more messages stored in the database having an assigned message identifier associated with the reply; and
cause the user interface of the user system to display the identified one or more messages with the identified reply as the message conversation.

18. The database system of claim 17, wherein the instructions are further operable to:
identify time stamps for the identified one or more messages and the identified reply; and
display the identified one or more messages and the identified reply in a chronological order based on the time stamps.

19. The database system of claim 18, wherein the message posted on the social media website does not include a conversation identifier.

20. The database system of claim 16, wherein the metadata includes one or more of:
an author identifier, a message identifier, a social media website identifier, an account identifier, and a timestamp.

* * * * *